3,177,257
OXIDATIVE HYDROCARBON CONVERSION

Kenneth D. Detling, Orinda, and Hervey H. Voge, Berkeley, Calif., assignors to Shell Oil Company, New York, N.Y., a corporation of Delaware
No Drawing. Filed May 29, 1961, Ser. No. 113,105
4 Claims. (Cl. 260—604)

This invention relates to improvements in catalytic, controlled vapor phase oxidative conversion of unsaturated hydrocarbons. A specific aspect of the invention relates to improvements in the production of acrolein and methacrolein by the controlled vapor phase oxidation of propylene or isobutylene, respectively, with the aid of catalysts comprising an oxygen-containing compound of molybdenum.

Catalytic materials comprising molybdenum, generally in the form of an oxygen-containing compound thereof, have been shown to be effective in catalyzing oxidative conversion of olefinic hydrocarbons. Efficient utilization of these catalysts generally requires a high temperature, for example, substantially above 450 and often as high as 650° C. This has heretofore handicapped efficient utilization of these catalysts in many practical scale operations. Attainment of the high temperature conditions presented serious difficulties, especially during the initiation period of the operation, and particularly when the catalyst is employed in the form of a fixed bed. The exceedingly high temperatures often required precluded the use of conventional types of practical scale equipment relying upon fluid heating media to effect the heating of the fixed catalyst bed by indirect heat exchange. Additionally, many of the conventional fluid heat controlling media employed do not enable the attainment of sufficiently high initial temperatures in the catalyst bed to initiate the reaction. The use of more drastic means often results in localized overheating, runaway temperature conditions, and permanent costly damage to the catalyst. When the reaction is highly exothermic, as for example, the oxidative conversion of olefins to alpha,beta-unsaturated aliphatic aldehydes, initiation of the reaction in a fixed bed of molybdenum catalyst becomes particularly difficult. Once the reaction is initiated, the reaction conditions must be tempered or controlled rapidly thereafter to enable conversion to proceed without overheating the catalyst. As a consequence, efficient utilization of the molybdenum catalysts in carrying out many of the oxidative conversions in practical scale apparatus employing the catalyst in the form of a fixed bed as, for example, tubular reactors using catalyst-filled tubes, shallow beds of enlarged cross-sectional areas, etc., has heretofore often been difficult when at all possible.

It is therefore an object of the present invention to provide an improved process for the oxidative conversion of olefinic hydrocarbons with the aid of catalysts comprising oxygen-containing compounds of molybdenum in the form of a fixed bed wherein the above difficulties are obviated to at least a substantial degree.

A specific object of the present invention is the provision of an improved process enabling the more efficient oxidative conversion of olefinic hydrocarbons comprising olefins having three and four carbon atoms to the molecule to corresponding alpha,beta-unsaturated aliphatic aldehydes with the aid of catalysts comprising oxygen-containing compounds of molybdenum in the form of a fixed bed. Other objects and advantages of the present invention will become apparent from the following detailed description thereof.

It has now been found that olefinic hydrocarbons are oxidatively converted with substantial improvement in the presence of a fixed catalyst bed comprising a catalyst consisting essentially of an oxygen-containing compound of molybdenum by incorporating a copper-containing catalyst in the initial part of said catalyst bed first contacted by said olefinic hydrocarbons. In one embodiment of the invention an oxygen-containing gas is injected into the catalyst bed at one or more points beyond the copper catalyst in the direction of flow of the reactants.

Molybdenum-containing catalysts employed in the oxidative olefin conversions in accordance with the invention comprises broadly those wherein molybdenum is present as an oxygen-containing compound. These include those wherein molybdenum is present as an oxide, a salt, a heteropoly acid, a metallate, mixtures thereof, or the like. Specific examples of suitable molybdenum-containing catalysts comprise the molybdenum oxides, phosphomolybdic acid, etc. Included in the suitable molybdenum-containing catalysts are those wherein the molybdenum is promoted by the presence of one or more other metals. Such additional metals may be present in the form of their oxides, as phosphates, heteropoly acids, and the like. They may be present in the form of physical and/or chemical combinations with the molybdenum component of the catalysts. Metals which may be present additionally with the molybdenum comprise, for example, lead, iron, tellurium, bismuth, vanadium, chromium, manganese, cobalt, nickel, indium, etc. A preferred group of molybdenum-containing catalysts comprise those catalysts wherein the molybdenum component is in chemical combination with oxygen and one or more members of the group comprising members of the right-hand column of Group V of the Periodic Table of the Elements, cobalt, nickel and tellurium. Specific examples of such preferred catalysts are: bismuth molybdate, bismuth phosphomolybdate, cobalt molybdate, nickel molybdate, etc. Of these catalysts those consisting essentially of molybdenum in combination with bismuth and oxygen are particularly preferred. These include those containing oxides of molybdenum and bismuth in either physical and/or chemical combination. They furthermore include such combinations of molybdenum with other metals and/or oxygen which have been further modified by the addition thereto of phosphorus or compounds of phosphorus. The suitable catalysts comprising molybdenum may be employed with or without suitable catalyst supports and/or diluent materials. Catalyst support materials which may be employed comprise, for example, the aluminous and siliceous catalyst support materials, such as, for example, silica, alumina, silica-alumina, Porocel, the many adsorptive aluminas, etc.; as well as pumice, silicon carbide, silicon, Alundum, Carborundum, crushed brick, clays, and the like. Comprised within the scope of the preferred molybdenum-containing catalysts are those modified by the inclusion of arsenic and/or tellurium. The suitable molybdenum-containing catalysts employed include broadly those disclosed heretofore as being capable of catalyzing the oxidation of olefins to unsaturated aldehydes and the oxidative dehydrogenation of olefins to diolefins.

In accordance with the invention the molybdenum-containing catalyst is employed in conjunction with a copper-containing catalyst in a single reaction zone. The suitable copper-containing catalysts comprise those consisting essentially of copper or an oxide of copper. Particularly preferred are those wherein the oxide is present as cuprous oxide, or in the form readily converted to cuprous oxide, under the oxidative hydrocarbon conversion conditions employed. The copper catalyst is generally used in combination with a suitable support material. Suitable support materials comprise any of the solid, inert catalyst support materials, for example, the aluminous and siliceous materials such as any of the adsorptive aluminas, bauxite, Porocel, Aloxite, silica, alumina-silica, mixtures thereof and the like; also silicon, Alundum, silicon carbide, Carborundum, pumice, crushed brick, etc. Particularly suitable catalysts comprises those disclosed and claimed in U.S. Patent No. 2,847,475.

Promoting amounts of one or more metals optionally may be comprised in the copper catalyst within the scope of the invention. Such promoting metals comprise, for example, iron, cobalt, nickel, cadmium, lead, silver, tellurium, manganese, zinc and the like. These may be present in metallic or oxidized form, or in combination with phosphorus.

Both the copper-containing catalyst and the molybdenum-containing catalyst are positioned in the same catalyst zone of the process in such a manner that the reactants entering the reaction zone come into contact with the copper-containing catalyst before encountering the molybdenum catalyst.

The process of the invention is carried out in any suitable type of apparatus enabling the passing of the admixed reactants serially through the two consecutive portions of catalyst in a single catalyst zone. The catalyst zone may comprise a zone of restricted cross-sectional area such as, for example, a tubular reactor, coil, or the like, or a zone of enlarged cross-sectional area, such as, for example, a reaction chamber containing the catalyst in the form of shallow beds positioned therein.

In a preferred method the reaction is executed with the aid of apparatus providing for the positioning of the two types of catalyst as contiguous portions of a single continuous stationary bed; the part of such a single bed first traversed by the reactants comprising the copper catalyst, the remainder of said bed containing the molybdenum catalyst. Such single catalyst bed, providing the two contiguous catalyst zones, may be formed, for example, by a single bed in a reaction chamber, or it may be constituted by a single or a plurality of reaction tubes each filled in part with the copper catalyst and the remainder thereof with the molybdenum catalyst.

The ratio of copper-containing catalyst to molybdenum-containing catalyst may vary within the scope of the invention. The catalyst bed will, however, in general, consist predominantly of the molybdenum catalyst, the copper catalyst constituting only a minor part thereof. The copper-containing catalyst may comprise for example, from about 0.5% to about 25%, and more preferably from about 1% to about 10%, by volume of the total catalyst bed. The relative amount of copper-catalyst preferably employed will vary to some extent with the specific reaction being carried out and the conditions employed.

The invention is applied with particular advantage in the production of acrolein, or methacrolein, by the reaction of oxygen with propylene, or isobutylene, respectively, in the presence of a molybdenum-containing catalyst.

In its application to the production of acrolein, propylene in admixture with an oxygen-containing gas is passed through a bed of catalyst, the part of which bed first contacted by the reactants consists essentially of a copper catalyst, for example, cuprous oxide supported in silicon carbide. The rest of the catalyst bed consists essentially of a catalyst comprising an oxygen-containing compound of molybdenum, for example, bismuth molybdate supported on silica. The part of the catalyst bed first contacted by the reactants, which consists essentially of the copper catalyst, is referred to herein and in the attached claims as the "initial part of the catalyst bed." The initial part of the catalyst bed employed in the production of acrolein may constitute, for example, from about 1 to about 10% by volume of the total catalyst bed. The catalyst bed may be positioned in a suitable reactor, such as, for example, a reactor of the heat exchanger type wherein the catalyst bed is positioned in a plurality of tubes arranged in parallel flow and surrounded by a heat controlling fluid.

Suitable conditions at which reaction of propylene with oxygen is carried out in accordance with the invention comprise temperatures of from 300 to about 550° C. and preferably from about 350 to about 475° C. Contact times of, for example, from about 0.1 to about 50 seconds, preferably from about 0.5 to about 25 seconds, are employed. The specific contact times preferably employed will depend to some extent upon the specific temperature conditions and catalyst used.

The mol ratio of oxygen to propylene in the charge is maintained in the range of from about 1:2 to about 3:1 and preferably from about 1:2 to about 2:1. Greater or lesser oxygen to propylene ratios may, however, be used within the scope of the invention.

The oxygen-containing gas introduced into the system may consist of relatively pure oxygen, admixtures of oxygen and one or more inert gases, such as nitrogen, argon, oxides of carbon, and the like, or air. The use of relatively concentrated oxygen streams, such as, for example, oxygen of at least 85% concentration obtained by the fractionation of air is somewhat preferred.

The oxygen and propylene charge introduced into the system may be subjected to any conventional pretreatment to effect the removal of impurities or undesired components therefrom.

Steam may optionally be introduced into the reaction zone. When used, the water vapor is generally added in a mol ratio of water vapor to propylene of from about 0.5:1 to about 15:1.

Under these conditions propylene is reacted with oxygen in a fixed catalyst bed comprising both catalysts under substantially improved conditions as compared to the use of a fixed catalyst bed consisting only of the molybdenum catalyst. Copper catalysts are capable of initiating reaction of propylene with oxygen at a relatively low temperature, for example, as much as 100° C. and more below temperatures at which any substantial reaction will be initiated in the presence of many of the selective molybdenum-containing catalysts when used alone. The exothermic heat liberated by the reaction thus initiated by the presence of the copper catalyst in the initial part of the catalyst bed functions to aid in bringing the remainder of the catalyst bed, consisting of the molybdenum-containing catalyst, to the high temperature at which it will initiate its function as catalyst in the absence of overheating of any substantial part of the catalyst bed. Exothermic heat liberated as a consequence of the presence of the copper-containing catalyst in the initial part of the bed now enables substantially optimum temperature conditions for the molybdenum-containing catalysts to be obtained and maintained with increased efficiency in stationary fixed catalyst bed types of operation in conventional practical scale equipment. Initiation of the reaction is now attained with substantially less heat input from external source than when using the molybdenum catalyst without copper catalyst in the initial part of the bed. The use of the copper-containing catalyst in the initial part of the catalyst bed furthermore enables the reaction to proceed with improved selectivity to acrolein, as compared with either catalyst alone under similar conditions.

*Example I*

Acrolein is produced by passing a reaction mixture containing 10% propylene, 5% oxygen, 20% nitrogen and 65% water vapor (mol percent) through a catalyst bed the initial part of which consists of cuprous oxide on silicon carbide and the rest of which consists of bismuth molybdate supported on silica. The initial cuprous oxide catalyst part of the catalyst bed constitutes 10% of the total volume of the catalyst bed. The catalyst bed is positioned in a tubular reactor provided with external heat controlling means. The reactor hot spot is brought up to, and maintained at, a temperature of about 420° C. A pressure of about 45 p.s.i.g. is maintained. The charge is passed through the reactor with a gas hourly space velocity (GHSV) of about 6,100. An oxygen conversion of 80% and a propylene conversion of 30% are obtained with a selectivity to acrolein of 75, based on propylene.

For the purpose of comparison the operation is repeated under substantially identical conditions, but with the use of a catalyst bed consisting only of the bismuth molybdate-silica catalyst. The conversion of oxygen obtained is 25% and of propylene only 6%, with a selectivity to acrolein of 60%, based on propylene.

The operation is again repeated under substantially identical conditions, but with the exception that the catalyst bed now consists solely of the cuprous oxide-silicon carbide catalyst. An oxygen conversion of 67% and of propylene of 14% is obtained with a selectivity to acrolein of 55%, based on propylene.

In the process of the invention it is possible, as a consequence of the presence of the initial copper-containing section in the molybdenum catalyst bed, to obtain very good results, as reflected by conversion to desired unsaturated aldehydes even with relatively low molar oxygen to propylene ratios in the charge.

Example II

An admixture containing 40% propylene, 8% oxygen, 32% nitrogen and 20% water vapor (mol percent) is passed through a bed of catalyst consisting of an initial portion made up of cuprous oxide on silicon carbide and constituting 6% by volume of the total catalyst bed, the rest of the catalyst bed consisting essentially of bismuth molybdate on silica. The catalyst bed is positioned in a tubular reactor, provided with external heat cntrolling means, and is maintained at about 370° C. and under 1 atmosphere of pressure, gauge. The charge is passed through the catalyst bed at a gas hourly space velocity (GHSV) of about 2,300. The operation is repeated twice under substantially identical conditions but with the exception that a catalyst bed consisting entirely of only cuprous oxide on silicon carbide is used in one of the operations, and a catalyst bed consisting entirely of bismuth molybdate on silica is used in the other. Under these conditions the conversion to acrolein obtained using the catalyst bed comprising an initial cuprous oxide-containing section is about one and one-half times as much as that obtained in the operations using either catalyst alone.

Production of unsaturated aldehydes by oxidative conversion of corresponding olefins in accordance with the invention may be carried out with the use of a progressively increasing molar ratio of oxygen to propylene through at least a portion of the operation. The operation may be initiated with a relatively low ratio of oxygen to propylene, for example, in the range of from about 1:2 to about 1:10 and thereafter gradually raised during the course of the operation to a value in the range of from about 2:1 to about 1:1. Progressively increasing the molar ratio of oxygen to propylene in the charge to the process often makes possible an increase in propylene conversion.

Example III

A mixture consisting essentially of 10% propylene, 5% oxygen, 20% nitrogen and 55% water vapor (mol percent) is passed through a catalyst bed consisting of an initial cuprous oxide on silicon carbide-containing section, forming 10% by volume of the total catalyst bed, the rest of the catalyst bed consisting essentially of bismuth molybdate on silica. The cuprous oxide portion of the bed is positioned so that it is the first part of the catalyst bed contacted by the entering reactants. The catalyst bed is positioned in a tubular reactor provided with external heat controlling means, and is maintained at a maximum temperature of about 420° C. and under a pressure of about 45 p.s.i.g. The charge is passed through the reactor with a gas hourly space velocity (GHSV) of about 6,100. Under these conditions a conversion of oxygen of 80% and of propylene of 30% is attained, with a selectivity to acrolein of about 75%, based on propylene. The charge composition is then gradually changed over a prolonged period of operation to result in a charge containing 8% propylene, 8% oxygen, 40% nitrogen and 44% water vapor (mol percent); the temperature and pressure and space velocities being maintained substantially constant. Under these conditions there is obtained an oxygen conversion of 80% and a propylene conversion of 60%, with a selectivity to acrolein of 75%, based on propylene.

Comprised within the scope of the invention is the use of a progressively increasing temperature throughout at least a part of the operation. In one method of operation the process is initiated at a relatively low temperature, for example, in the range of from about 250° to about 350° C. and thereafter gradually raised during the course of the process to a higher temperature, for example, in the range of from about 375° to about 475° C. In a preferred method of carrying out the invention the use of a progressively increasing temperature is employed in combination with a gradually increasing molar ratio of oxygen to propylene in the charge.

In one embodiment of the invention the oxidative conversion of olefinic hydrocarbons is initiated in the presence of the molybdenum catalyst in combination with the initial cuprous oxide catalyst portion of the bed, and thereafter the charge to the process is modified to effect substantial alteration in the behavior of the cuprous oxide section of the catalyst bed. Such alteration of the charge may comprise a change in relative proportions of components and/or the addition of new components. Materials capable of modifying and/or selectively poisoning the cuprous oxide catalyst without substantially affecting the molybdenum-containing catalyst, may be added to the charge. The specific modifying agent, and the amount thereof used, is chosen to obtain the specific type, and degree, of modification of the copper catalyst required. A same agent may function to selectively promote, selectively deactivate, and even selectively poison substantially completely, the copper catalyst, depending upon the amounts of the agent used. The amount required to obtain a specific result will vary in accordance with the specific catalysts and conditions employed and also the specific reactants charged. These are readily determined in practical operations. Suitable modifying, or selective poisoning material, comprise, for example, sulfur, sulfur containing compounds such as $H_2S$, $COS$, $SO_2$, methyl mercaptan, etc.; also selenium, tellurium, or arsenic-containing compounds. The use of 10–50 p.p.m. of a sulfur compound is somewhat preferred. Other materials capable of selectively modifying the effect of the cuprous oxide may be added to the charge to the reaction, or may be separately injected into the initial portion of catalyst bed, during the course of the process.

In another embodiment of the invention reaction conditions are controlled to result in substantially complete utilization of the olefinic charge to the combination catalyst bed. To obtain conditions resulting in optimum olefin conversion to desired unsaturated products, conditions within the catalyst bed are controlled to result in maximum utilization of the cuprous oxide catalyst in an initial reaction stage, followed by completion of the reaction in the molybdenum catalyst bed proper. Such conditions are obtained by the utilization of a charge to the reaction comprising a relatively low ratio of oxygen to propylene, for example, a molar ratio of oxygen to propylene in the range of from about 1:1 to about 1:10 while injecting additional oxygen-containing gas into the catalyst bed at a point beyond the initial cuprous oxide-containing portion of the bed in the direction of flow of the reactants. The oxygen-containing gas so injected into the catalyst bed may consist of substantially pure oxygen or a concentrated oxygen-containing gas such as, for example, concentrated oxygen of a purity of at least 85% obtained by the fractionation of air. The use of dilute oxygen-containing streams as the oxygen injected into the catalyst bed may, however, be employed within the scope of the invention; thus air may be injected as oxygen-containing gas into the catalyst bed. Injection of the oxygen-containing gas into the molybdenum-containing catalyst portion of the catalyst bed is preferably controlled to obtain a relatively high molar ratio of oxygen to olefin in at least a substantial portion of the molybdenum catalyst-containing portion of the catalyst bed. Injection of the oxygen is preferably controlled to obtain an approximate molar ratio of oxygen to propylene in the range of, for example, from about 1:1 to about 3:1 in the molybdenum catalyst-containing section of the catalyst bed. Under these conditions, substantially complete utilization of propylene is made possible with the aid of a fixed catalyst bed consisting predominantly of a catalyst comprising an oxygen-containing compound of molybdenum. Injection of the oxygen-containing gas into the catalyst bed may be effected by suitable conventional means. When using tubular reactors oxygen feed lines may be passed longitudinally through the catalyst bed to discharge the additional oxygen-containing charge into one or more sections of the molybdenum catalyst-containing portion of the catalyst bed. Other suitable expedients comprise a spacing between the cuprous oxide portion and the molybdenum catalyst portion of the catalyst bed; the space between the two portions of catalyst thus forming a mixing zone into which a part or all of the additional oxygen charged into the catalyst bed may be injected. Such a mixing zone in the catalyst bed proper is preferably maintained at a minimum volume. The intermediate mixing zone is preferably filled with a suitable relatively inert contact material, such as, for example, Carborundum, silicon carbide, silicon, crushed brick, Alundum, aluminum mesh or grid, stainless steel mesh or grid, or a fibrous mesh as of coarse glass wool.

The process of the invention thus provides a highly efficient method for the production of acrolein and methacrolein from propylene and isobutylene, respectively, under conditions enabling the obtaining of advantages peculiar to the use of copper-containing and molybdenum-containing catalysts, with only a single combination fixed bed.

Effluence from the reaction zone is subjected to conventional product separating means comprising one or more such steps as, for example, quenching, selective absorption, liquid phase extraction, extractive distillation, fractionation, and the like. Unconverted reactants, comprising olefins and oxygen may be recycled in part or entirety to one or more points within the reaction zone.

Promoters or agents capable of modifying the effect of either, or both, of the catalysts may be added to the charge, or separately introduced into the bed. Such suitable promoters comprise, for example, small amounts of halogens, such as chlorine, bromine, iodine, and compounds thereof; sulfur, selenium, tellurium, arsenic and antimony, as well as compounds thereof, etc.

Inert gases such as, for example, paraffinic hydrocarbons, nitrogen, argon, oxides of carbon, helium, and the like may be comprised in the charge to the reaction zone. Such materials may be present in the olefin and/or oxygen charged to the process, and/or may be added for the purpose of aiding in maintaining desired operating conditions.

Although the above detailed description of the invention has stressed its application to the production of alpha,beta-unsaturated aliphatic aldehydes from corresponding olefinic hydrocarbons the invention is not necessarily limited in its application to the execution of only these reactions, but may be applied broadly to the execution of oxidative olefinic hydrocarbon conversions. Thus, the invention is applied to oxidative dehydrogenation of olefins to diolefins, the oxidation of acetaldehyde to acetic acid, oxidation of methanol to formaldehyde, oxidation of acetylene to acetaldehyde, oxidation of benzene to maleic anhydride and fumaric acid, oxidation of toluene to benzaldehyde, oxidation of isopropyl alcohol to acetone, oxidation of allyl alcohol to acrolein, oxidation of acrolein to acrylic acid, oxidation of cinnamic alcohol to cinnamic aldehyde, oxidation of glycerol to glyceraldehyde, oxidative dehydrogenation of ethylbenzene to styrene, oxidative dehydrogenation of n-butylene to butadiene, oxidative dehydrogenation of methyl butenes to isoprene, and the like.

Comprised within the scope of the invention is the initiation of the oxidative conversion with one type of reaction followed by completion of the operation with a different reaction. Thus, the initial reaction may be one capable of being initiated at a relatively low temperature in the presence of a copper-containing catalyst, preferably an exothermic reaction. Once initiated, this reaction may be terminated, in part or entirely, by selective poisoning of the initial copper-containing portion of the bed, or by use of a charge composition favoring suppression of activity of the copper catalyst. The operation then continues with a charge affected primarily by the molybdenum catalyst-containing portion of the catalyst bed. Thus, the oxidative conversion may consist of one wherein an olefin, such as, propylene and/or a butylene, is initially charged in admixture with oxygen at a relatively low initial temperature. As reaction proceeds the temperature is raised. The copper catalyst is poisoned selectively by addition of a suitable agent, for example, sulfur or a sulfur-containing compound, to the charge, and the operation is completed by the passage of an admixture of the same or a different olefin and oxygen-containing gas through the bed under temperature conditions which, in the presence of the molybdenum-containing catalyst, results in the interaction of the olefin and oxygen with the formation of unsaturated reaction products.

We claim as our invention:

1. In a process for the production of an unsaturated aldehyde selected from the group consisting of acrolein and methacrolein, wherein an olefin selected from the group consisting of propylene and isobutylene in admixture with oxygen, in a molar ratio of oxygen to said olefin of from about 1:2 to about 3:1, is passed through a continuous, stationary, fixed bed of catalyst consisting essentially of an oxygen-containing compound of molybdenum wherein the molybdenum component is in chemical combination with oxygen and at least one member of the group consisting of the metals in the right-hand column of Group V of the Periodic Table of the Elements, cobalt, nickel, and tellurium, at a temperature of from about 250 to about 550° C. and a contact time of from about 0.1 to about 50 seconds, the improvement of incorporating a copper-containing catalyst selected from the group consisting of copper and the oxides of copper in the initial 0.5 to about 25% by volume portion of said continuous, stationary, fixed bed of catalyst first contacted by said admixture of olefin and oxygen.

2. The process in accordance with claim 1 wherein said copper-containing catalysts consists essentially of cuprous oxide.

3. The process in accordance with claim 2 wherein said catalyst comprising an oxygen-containing compound of molybdenum consists essentially of a bismuth molybdate catalyst.

4. In the process for the production of acrolein wherein propylene in admixture with oxygen in a mol ratio of propylene to oxygen of from about 1:2 to about 2:1 is passed through a continuous, stationary, fixed bed of catalyst consisting essentially of molybdenum in chemical combination with oxygen and at least one member of the group consisting of the metals in the right-hand column of Group V of the Periodic Table of the Elements, cobalt, nickel and tellurium, at a temperature of from about 350 to about 475° C. and a contact time of from about 0.5 to about 25 seconds, the improvement of employing cuprous oxide as the initial 1 to about 10% by volume portion of said continuous, stationary, fixed bed of catalyst first contacted by said admixture of propylene and oxygen.

References Cited by the Examiner
UNITED STATES PATENTS

| | | | |
|---|---|---|---|
| 2,627,527 | 2/53 | Connolly et al. | 260—604 |
| 2,941,007 | 6/60 | Callahan et al. | 260—604 |
| 2,990,427 | 6/61 | Caldwell | 260—604 |

FOREIGN PATENTS

| | | |
|---|---|---|
| 678,557 | 9/52 | Great Britain. |
| 694,354 | 7/53 | Great Britain. |
| 507,347 | 11/54 | Canada. |

LEON ZITVER, *Primary Examiner*.

CHARLES B. PARKER, *Examiner*.